United States Patent [19]
Gerber

[11] Patent Number: 5,063,676
[45] Date of Patent: Nov. 12, 1991

[54] CABLE DRIVE SYSTEM FOR CARRIAGE MOVEMENT AND METHOD OF USE

[75] Inventor: Heinz J. Gerber, West Hartford, Conn.

[73] Assignee: Gerber Garment Technology, Inc., Tolland, Conn.

[21] Appl. No.: 479,343

[22] Filed: Feb. 13, 1990

[51] Int. Cl.⁵ .............................................. B43L 13/00
[52] U.S. Cl. .................................... 33/1 M; 33/32.4; 346/139 B
[58] Field of Search ...................... 33/1 M, 18.1, 32.1, 33/32.3, 32.4, 32.5, 32.6, 23.03, 444, 35; 346/139 R, 139 A, 139 B

[56] References Cited

U.S. PATENT DOCUMENTS

| | | | |
|---|---|---|---|
| 2,746,151 | 5/1956 | Kennedy | 346/139 B |
| 3,553,842 | 1/1971 | Gerber et al. | 346/139 B |
| 3,611,819 | 10/1971 | Muller et al. | 33/1 M |
| 4,327,596 | 5/1982 | Simon | 33/1 M |
| 4,369,579 | 1/1983 | Mizoule | 33/18.1 |
| 4,420,886 | 12/1983 | Amano | 33/1 M |
| 4,524,520 | 6/1985 | Levy | 33/1 M |
| 4,527,119 | 7/1985 | Rogers et al. | 33/1 M |
| 4,665,619 | 5/1987 | Pearl | 33/32.3 |
| 4,916,819 | 4/1990 | Gerber | 33/1 M |

Primary Examiner—William A. Cuchlinski, Jr.
Assistant Examiner—C. W. Fulton
Attorney, Agent, or Firm—McCormick, Paulding & Huber

[57] ABSTRACT

A positioning system for use in a plotter having a reverse axis arrangement moves the Y carriage along two generally parallel spaced apart guides and comprises a first and second cable each having equal lenghts and forming a loop respectively attached to opposite ends of the Y carriage. Each of the cables is commonly wound around a single drive drum having double helical grooves formed on it into which respective ones of the first and the second cables is received. Each end of each cable is secured to the drum and is wrapped along its length such that portions of each of the first and second cables are directed away from and back towards the drum to define the loops which move the carriage. This arrangement allows an equal number of turns of each of the first and second cables to be maintained on the drum regardless of the direction in which it is rotated.

19 Claims, 3 Drawing Sheets

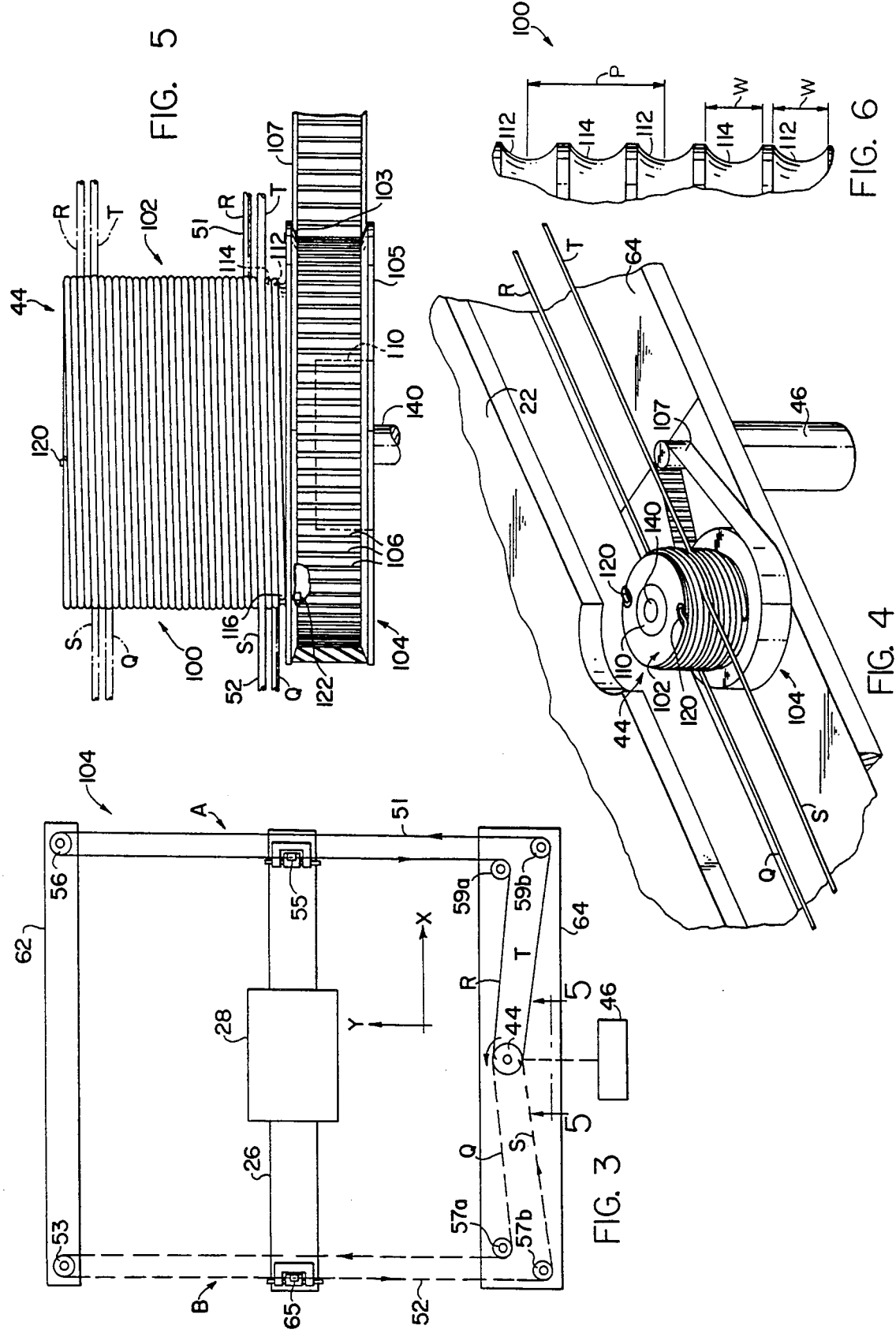

CABLE DRIVE SYSTEM FOR CARRIAGE MOVEMENT AND METHOD OF USE

CROSS REFERENCE TO RELATED APPLICATION

The present invention relates to co-pending U.S. patent application Ser. No. 195,128, now U.S. Pat. No. 4,916,819 entitled PROGRESSIVE PLOTTER WITH UNIDIRECTIONAL PAPER MOVEMENT filed on May 1, 1988 in the name of the same inventor of the present invention and also being commonly assigned therewith.

BACKGROUND OF THE INVENTION

This invention relates to a carriage positioning system and is particularly useful in a system using cables for positioning a carriage along either the X or Y axis.

The invention can be used particularly effectively in reverse axis plotters of the type in which the width dimension of the plotter is greater than its length and in which a tool such as a pen or other instrument is moveable in X and Y coordinate directions relative to a surface supporting a sheet of paper or other sheet material upon which figures, characters or other graphics are created; and deals more particularly with an improvement in the drive system responsible for moving the Y carriage wherein means are provided in the system for more evenly moving the ends of the Y carriage along the length of the plotter to thereby position the drawing instrument along a desired path to be followed with enhanced accuracy.

In the co-pending application now Ser. No. 195,128, now U.S. Pat. No. 4,916,819 a plotter is disclosed wherein two drive systems are employed each respectively driving X and Y carriages for moving a drawing instrument relative to a support surface through X and Y coordinate directions. In each of these drive systems a single cable is driven by a rotating drum and is so looped relative to its associated carriage to move it along a given coordinate axis. Since in these plotters, the Y carriage spans its width and is thus substantially shorter than the length of the plotter, the Y carriage must be moved at its ends by the cable which drives it with particular evenness since the slightest skewing of this carriage may result in a flaw in the graphic information being created by the moving instrument on the sheet material below it.

A problem particular to such single cable Y carriage drives is that as the cable feeds out from one portion of the drum and is taken up by the other, an unequal number of winds are often formed on the drive drum between the lengths of cable which connect to each end of the Y carriage. This unequal winding on the drive drum may undesirably result at times in skewing of the Y carriage due to disproportionate stretching of the cable.

Accordingly it is an object of the present invention to provide a cable drive system in a plotter such as aforesaid which is capable of moving a carriage at its opposite ends without skewing it relative to the direction which it is moved.

It is yet a further object of the present invention to provide a drum construction capable of simultaneously wrapping and feeding out two separate cables each individually connected to the opposite ends of a carriage.

Still a further object of the present invention is to provide a cable drive system using two relatively short, equal length cables to provide a drive system having high spring constants to assure a high frequency response system.

SUMMARY OF THE INVENTION

The invention resides in a positioning system which drives a moveable carriage carrying an instrument above a support surface. The carriage moved by the positioning system is guided along two parallel spaced apart guides which extend along the support surface. The carriage is connected at each opposite end to a first cable and a second cable. The first and second cables through suitable pulley means are each oriented along the guides looping lengthwise of them and wrapping around a common drive drum. The drum is driven by a drive motor in two rotational directions and moves the carriage along its path of travel when appropriately rotated.

The drum has a generally cylindrical portion and is provided along its length with double helical grooves defined by a first groove into which the first cable is received and a second groove which receives the second cable. The first and second cables are each secured at one end to the lower end of the cylindrical portion and from this point separately wrap upwardly toward its top where the other ends of each of the cables are secured to the drum. To form the loops which drive the carriage, portions of each of the first and second cables leave from the drum on one turn of its associated groove and return to it at the next consecutive ordered turn. This allows an equal number of turns of both the first and second cables to be maintained on the drum when it is rotated in either direction thereby allowing both ends of the carriage to be moved evenly. Also, since two cables are being used, the lengths of the cables are shorter thereby increasing the response frequency of the system.

BRIEF DESCRIPTION OF THE DRAWINGS

FIG. 3 is a schematic view of the cable drive embodying the present invention for driving the Y carriage in the Y coordinate direction.

FIG. 4 is a fragmentary perspective view of the drive drum and the cable arrangement.

FIG. 5 is a partially fragmentary front elevation view of the drive drum in enlarged scale taken along line 5—5 in FIG. 3.

FIG. 6 is a fragmentary view in enlarged scale of the double groove configuration of the drive drum shown in FIG. 5.

DETAILED DESCRIPTION OF THE PREFERRED EMBODIMENT

Figure 1:
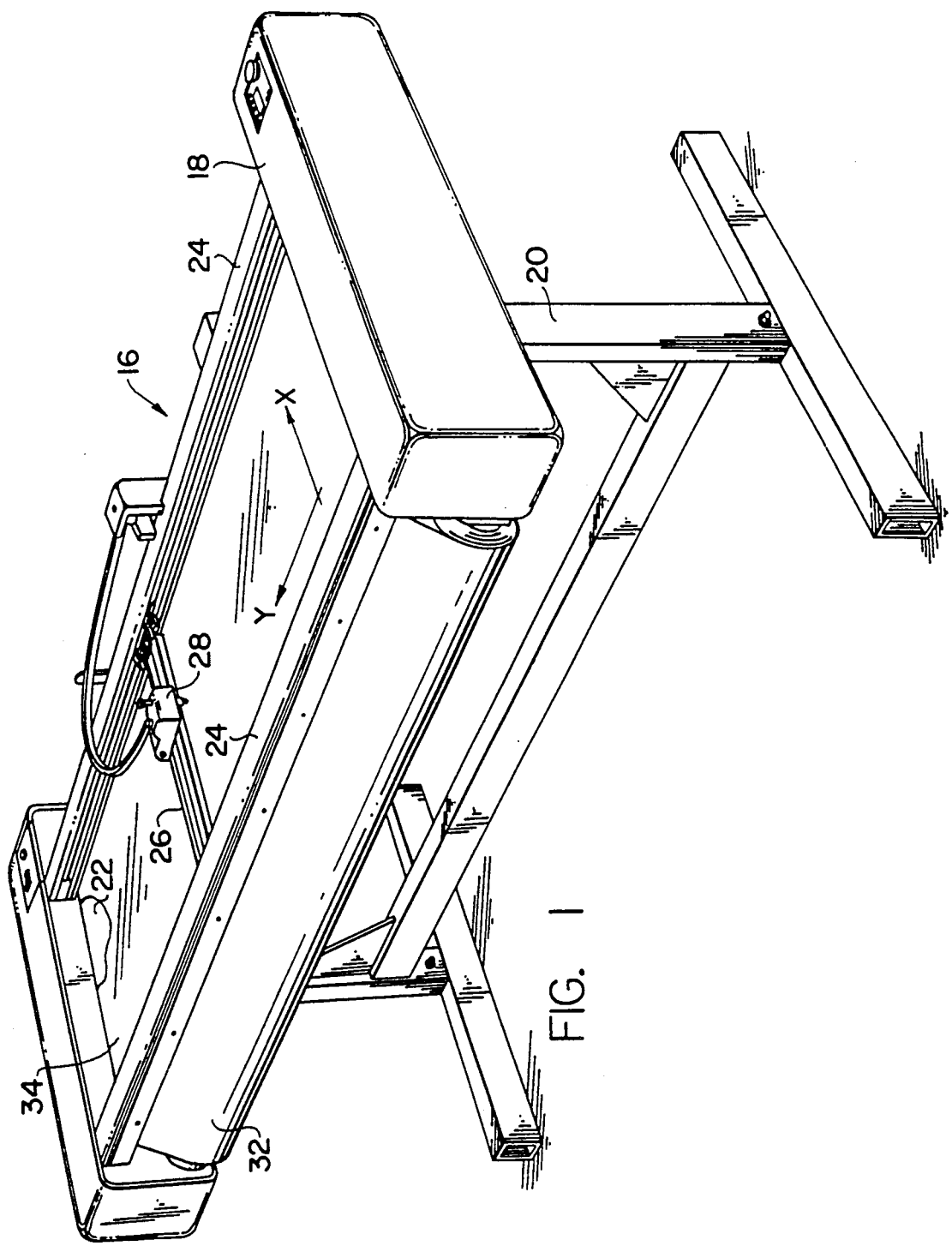
FIG. 1 is a perspective view of the plotter embodying the drive system of the present invention.
Figure 2:
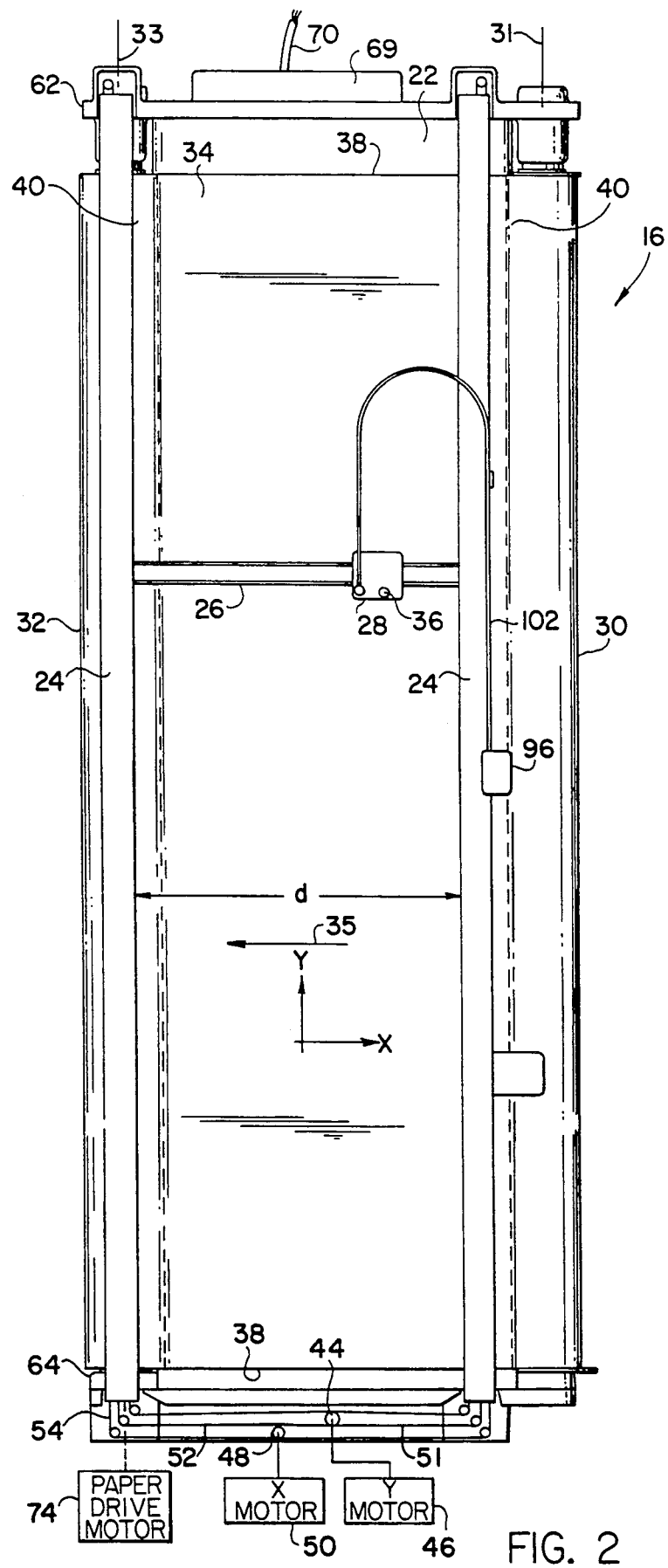
FIG. 2 is a plan view of the plotter of FIG. 1 with the end covers removed.

Turning to the drawings, and first referring to FIGS. 1 and 2, a progressive plotter embodying the invention is generally shown by reference numeral 16. The plotter 16 comprises a table 18 having a base structure 20 and an upwardly facing support surface 22, two parallel guide rails, 24,24 and an elongated Y carriage 26 moveable along the guide rails 24,24 in the illustrated Y coordinate direction, a pen or X carriage 28 moveable along the Y carriage 26 in the illustrated X coordinate direction.

As best seen in FIG. 2, the table 18 includes at its right hand side a supply roll 30 of paper for rotation around central axis 31 and also includes a takeup roll 32 for rotation around its central axis 33. Paper 34 from the supply roll 30 is guided over the support surface 22 and wound upon the takeup roll 32. A paper drive motor 74 rotates the takeup roll 32 to wind paper onto it pulling paper from the supply roll and moving the paper in the direction 35 extending parallel to the longitudinal axis of the paper. A lengthwise section of the paper is supported by the support surface 22 and may be drawn upon by a pen 36 carried by the pen carriage 28.

The plotter 16 is particularly adapted to the making of long drawings such as markers for the garment industry even though the plotting area has a dimension along the length of the drawing which is usually many times smaller than the drawing length. For example, in a given instance the paper 34 may have a width of 80 inches and a drawing made on the paper 34 may have a length of 30 to 50 yards or more.

The guide rails 24,24 are spaced apart from one another by the distance d as shown in FIG. 2 which is at least less than half of the width of the paper 34. The support surface 22 between the end edges 38,38 has a width of about 85¼ inches and between the side edges 40,40 has a length of about 23¾ inches. The pen 36 has a range of movement of 80 inches in the Y coordinate direction and the range of movement of about 17 inches in the X coordinate direction thereby defining on the support surface 22 a plotting area of approximately 17×80 inches.

The Y carriage 26 is elongated so as to extend between the two guide rails 24,24, but the short spacing between the guide rails means that this carriage can be made of relatively small size and lightweight, and can easily be supported and guided at its two ends by the rails 24,24 while still being sufficiently resistant to vibration and deflection to avoid plotting errors. Likewise, the pen carriage 28 may also be made of a relatively small size and lightweight. Various means may however be used for guiding the carriages 26 and 28 in the X and Y coordinate directions respectively without the departing from the invention.

To effect movement of the drawing instrument 36 along the indicated X coordinate direction, an X carriage drive motor 50 mounted to an end plate 64 is provided and is rotatably coupled to a drum 48 drivingly engaging its associated carriage 28 by a conventional cable connection 54, such as disclosed in the aforementioned co-pending application Ser. No. 195,128 now U.S. Pat. No. 4,916,819. As will hereinafter be discussed in greater detail, the Y carriage is driven by its own cable system, but for the moment it is important only that it be understood that a Y carriage drive motor 46 is provided to accomplish this purpose.

An end plate 62 supports a control unit 69 which includes a digital processor, several amplifiers and other electronic components as needed for control of the plotter, the unit 69 being connectable to other parts of a computer working system thorough a cable 70. Data defining drawings is processed by the processor and converted into commands subsequently delivered to the Y drive motor 46, the X motor 50 and takeup roll drive motor 74 to control movement of the pen and paper in such a way as to cause the pen to draw the drawings represented by the data on the paper.

In accordance with the invention, FIGS. 3 thorough 6 illustrate a Y carriage cable drive system indicated generally as 104 for moving the carriage 26 in opposite directions along the indicated Y coordinate axis. The system 104 includes a drum 44 rotatably coupled to the drive motor 46 mounted to the plate 64 and includes a first cable 51 connected for movement with one end of the Y carriage 26 at 55 and a second cable 52 (dotted line) connected for movement at 65 with the other opposite end of the Y carriage 26. The cables 51 and 52 are equally long with respect to one another and are sufficiently flexibly adapted for traveling along one of two separate loops A and B, each respectively associated with an opposite end of the carriage 26. Since the driving loads to the carriage 26 are being distributed by two cables instead of one, each cable diameter may be reduced in size, for example, about 20 percent. Each of the loops A and B is defined primarily by a pulley 53,56 remotely positioned on the end plate 62 and a corresponding pair of pulleys 57a, 57b and 59a,59b each located proximate the drum 44 on the end plate 64.

The drum 44 has an upper cylindrical portion 102 connected at its lower end with a base portion 104 defined by two spaced apart annular flanges 103 and 105. A series of radially disposed teeth 106 are formed in the base portion 104 between these flanges and receive in driving engagement therewith a drive belt 107 rotatably connecting the drum 44 with the drive motor 46. Suitable journaling means, such as bearings 110, provided at the upper and lower ends of the drum 44, mount it for rotation on a shaft 140 upwardly extending from the end plate 64.

Referring now to FIGS. 5 and 6 and to the means by which the drum 44 is configured for simultaneously wrapping and feeding out equal lengths of the cables 51 and 52 as it is rotated, it will be seen that right-hand double helix grooves 100 are formed on the outer surface of the cylindrical portion 102 of the drum 44. The double groove configuration 100 is defined by a first groove 112 and a second groove 114 each having a generally curved profile for respectively receiving the first and the second cables 51 and 52 therein. The first and second grooves 112,114 each alternate sequentially with one another beginning with groove 112 to form consecutive turns starting from the juncture where the base and the cylindrical portions meet and proceeding upwardly therefrom to the top end surface of the cylindrical portion 102.

Both the first and second grooves 112 and 114 have equal widths W such that the pitch P of each of these grooves is defined by twice the width dimension W, which in the preferred embodiment of the invention is equal to approximately 0.118 inch. The evenly spaced and parallel spirals of the grooves 112 and 114 are formed by machining them simultaneously into the outer surface of the cylindrical portion 102 using a double tool. The drum 44 may be for this purpose formed from a variety of suitable materials, such as a composite polymer.

In the preferred embodiment of the invention, each of the cables 51 and 52 is commonly anchored at one end within the base portion 104 at 122 and communicates outwardly from this point through a common opening 116 in the cylindrical portion 102 at which opening the entrance ends of the first and second grooves 112 and 114 are adjacently disposed. From here, the cables 51 and 52 are respectively received within the first and second grooves 112,114 and proceed to wrap upwardly toward the top end surface of the cylindrical portion 102 in a parallel relationship with one another occupying alternate consecutive turns of the double helix grooves 100. Once the first and second cables 51 and 52 arrive at the top of the cylindrical portion 102, the other opposite ends of these cables are secured to the drum at this location within diametrically opposed recesses 120,120 each respectively communicating with an associated one of the first and second grooves, though they could be secured at one common location.

To form loops A and B, portions of the first and second cables 51,52 must feed out and return to the drum 44. Taking these portions as they are arranged on the drum 44 from lowest to highest and as shown in FIGS. 4 and 5, it will be seen that the second cable 52 at section Q of the loop B first feeds out of the back of the drum 44 and engages with the pulley 57a. It then engages with the remote pulley 53 and is directed back towards the drum 44 along which length it is attached at 65 to the carriage 26. Thereafter, the second cable 52 engages with pulley 57b and is subsequently directed back to the front of the drum 44 along return section S of the loop B.

In a similar but reversed manner, the first cable 51 leaves from the front of the drum 44 along section T of loop A and engages upon pulley 59b and travels toward the remote pulley 56 where it is directed back towards the drum 44. Along this length, the first cable 51 is attached at 55 to the opposite end of the carriage 26 and subsequently engages with pulley 59a directing it to the rear of the drum along return section R of the loop A. It should further be understood from FIG. 5 that the first and second cables 51 and 52 are wrapped around the drum 44 such that section Q of loop B always leaves from a turn on groove 114 just below the turn in which section S returns and that section T of loop A always leaves from a turn on groove 112 just below the turn in which section R returns and that these four sections as a group will always be consecutively ordered along the double grooves 100. As such, the outgoing and returning sections of each of the loops A and B are always separated from each other by a constant distance, preferably one groove width.

In operation, the drum 44 rotates in either direction to simultaneously take in and feed out equal lengths of each of the first and second cables 51 and 52. The positions of sections R,T and S,Q on the drum 44 shown in FIG. 5 in full line generally correspond to the drum 44 having been rotated clockwise to the limit of the carriage movement whereas the positions taken by these sections as shown in phantom line correspond to the drum 44 having been rotated counterclockwise to the other limit of the carriage movement. Rotation of the drum in the clockwise direction will cause the carriage 26 to be moved towards the end plate 64 while rotating the drum in an opposite direction will cause the carriage 26 to move towards the opposite end plate 62. Regardless of which direction the drum 44 is rotated, sections R,T and S,O will nevertheless move as a group vertically along the drum 44. As an illustrative example of this, the drum 44 has about 32 full turns formed in it, 16 of which are defined by the first groove 112 and the remaining 16 being defined by the second groove 114. Taking these turns in order from bottom to top, the full line positions of sections T and R are associated respectively with the third and the fifth ordered turns while those of sections Q and S are associated respectively with the second and forth ordered turns of the helix 100. Once the drum 44 is rotated counterclockwise, these four sections will together move upwardly along the drum surface, until for example as shown in phantom line, sections T and R respectively occupy the twenty-seventh and twenty-ninth ordered turns and sections Q and S respectively occupy the twenty-sixth and twenty-eighth ordered turns of the helix 100. This result is important in that for each of the first and second cables, rotation of the drum 44 in either direction does not result in unequal amounts of one cable or the other being wound around the drum when it is rotated in different directions. That is, regardless of the direction in which the drum 44 rotates, the first and second cables 51,52 will always experience the same amount of winding upon the drum 44 thereby eliminating the possibility of Y carriage skewing.

By the foregoing, it will of course be understood that various changes may be made to the aforementioned cable system without departing from the broader aspects of the invention. For example, it is possible to anchor the first and second cables 51 and 52 in the base portion 104 at points diametrically opposite from one another and subsequently introduce these cables into a their associated grooves at points 180 degrees apart from one another and thereafter wrap them upwardly to the top of the cylindrical portion of the drum where they may be secured at a common point. Accordingly, the invention has been described by way of illustration rather than limitation.

I claim:

1. A positioning system for moving a carriage relative to a material support surface, said positioning system comprising:
    a support;
    a carriage movable on said support and relative to a material support surface;
    a drum mounted for rotation on said support and driven by drive means in either rotational direction;
    a first cable secured to said drum and forming a first loop secured at a point along its length to one end of said carriage;
    a second cable secured to said drum and forming a second loop secured at a point along its length to the opposite end of said carriage; and
    means for wrapping each of said first and said second cables in substantially equal turns about said drum and maintaining said equal turns of said first and second cables on said drum when it is rotated in either direction.

2. A positioning system as defined in claim 1 further characterized in that each of said first and said second cables have equal lengths; and
    opposite ends of each of said first and said second cables each being secured to said drum at two vertically spaced apart locations.

3. A positioning system as defined in claim 2 further characterized in that said means for wrapping each of said first and said second cables around said drum includes double helix grooves formed on the outer surface of said drum between said two vertically spaced apart locations.

4. A positioning system as defined in claim 3 further characterized in that said double helix groove is defined by a first groove and a second groove;
    said first and said second grooves each being respectively configured to receive said first and said second cables therein; and
    wherein said first and said second grooves have substantially equal widths.

5. A positioning system as defined in claim 4 further characterized in that each of said first and said second grooves have a pitch equal to two times its width; and wherein each of said grooves in side view has a generally curved profile correspondingly configured for receiving each of said first and said second cables therein.

6. A positioning system as defined in claim 5 further characterized in that said carriage at each end being received within two parallel spaced apart guides and said first cable is associated with a rightmost one of said two guides and said second cable is associated with the leftmost one of said guides;

each of said first and second cables at one end being commonly anchored with one another in said drum at the lower of said two vertically spaced locations; and as taken from said common anchoring point on said drum, said first cable first engages within said first groove below the point where said second cable first engages with said second groove.

7. A positioning system as defined in claim 6 further characterized in that the other ends of said first and said second cables are secured at the top of said drum at points diametrically opposite from one another.

8. A positioning system as defined in claim 7 further characterized in that the rear of said drum faces said support surface and the front of said drum faces oppositely thereof, and as taken from said common anchoring point on said drum and upwardly therefrom;

a portion of said second cable leaves said second groove from the rear of said drum and engages along a second pulley means defining said second loop;

a portion of said first cable next leaves said first groove from the front of said drum and engages along a first pulley means defining said first loop; and said second cable returns to the front of said drum in the next ordered turn of said second groove from which it left and is thereafter wrapped upwardly in the remaining length of said second groove to one of said diametrically opposed securing points on said top of said drum; and wherein said first cable returns to the rear of the drum in the next ordered turn of said first groove from which it left and thereafter is wrapped upwardly in the remaining length of said first groove to the other of diametrically opposed securing points on said top of said drum.

9. A positioning system as defined in claim 8 further characterized in that said first pulley means includes a pair of first and a second pulleys each rotatably mounted in a spatial relationship with one another on said support generally adjacent said drum and includes a third pulley mounted on said support remotely of said first and second pulley pair; and wherein said first cable leaves said drum and engages with said first pulley thereafter engaging on said third pulley and subsequently engages with said second pulley before returning to said drum.

10. A positioning system as defined in claim 9 further characterized in that said second pulley means includes a pair of forth and a fifth pulleys each rotatably mounted in a spatial relationship with one another on said support generally adjacent said drum and includes a sixth pulley mounted on said support remotely of said forth and fifth pulley pair; and wherein said second cable leaves said drum and engages with said fourth pulley thereafter engaging on said sixth pulley and subsequently engaging with said fifth pulley before returning to said drum.

11. A positioning system as defined in claim 10 further characterized in that said second and forth pulleys are located inwardly of each of said first and said sixth pulleys taken relative to said material support surface.

12. A positioning system as defined in claim 3 further characterized in that said drum has a lower base portion connected with an upper cylindrical portion;

said upper cylindrical portion defines said outer surface in which said double helix grooves are formed; and wherein said lower base portion has a series of radially disposed spaced apart teeth engaging with a drive belt rotatably connecting said drum with a drive motor.

13. A positioning system as defined in claim 12 further characterized in that said first and said second grooves are simultaneously machined onto the surface of said cylindrical portion of said drum.

14. In a plotter of the type having a carriage moveable relative to a support surface, a positioning system for moving said carriage in a given direction comprising:

a first cable means forming a first loop and being secured intermediate its ends to a first end of said carriage;

a second cable means forming a second loop and being secured intermediate its ends to an opposite second end of said carriage;

a drum driven by a drive means in either rotational direction;

each of said ends of said first and said second cable means being secured to said drum with portions of said first and said second cables respectively being wrapped equally around said drum; and means provided on said drum for wrapping said portions of said first and said second cable means about it so that equal amounts of each of said first and said second cable means remain on said drum as portions of said first and second cable means are simultaneously fed out and taken in when said drum is rotated in either direction.

15. A positioning system as defined in claim 14 further characterized in that each of said first and said second cable means have the same length; and said drum has a generally cylindrical portion which includes said means for wrapping said portions of said first and said second cables equally therearound.

16. A positioning system as defined in claim 15 further characterized in that said means for wrapping each of said first and said second cables around said drum includes a double groove formed around the outer surface of said cylindrical portion; and wherein each of said first and second cables is respectively received within one groove of said double groove.

17. A positioning system as defined in claim 16 further characterized in that said double groove has an even number of full turns with each groove comprising one half of the number of total turns.

18. A method of moving a carriage in a plotter relative to a support surface using a common drive drum, said method comprising:

providing a first cable and a second cable;

providing a drive drum rotatable in either direction and having a double helical groove defined by a first and a second groove each defining on said drum consecutively ordered and evenly spaced apart turns;

securing the ends of each of said a first and second cables to said drum at the beginning and at the end of said double groove;

wrapping said first and second cables equally about said drum respectively within each of said first and second grooves;

forming a first loop and a second loop respectively driving opposite ends of said carriage by directing portions of each of said first and said second cables outwardly of said drum from consecutively ordered turns of said first and said second grooves and returning them back to said drum respectively at the next consecutively ordered turn of said first and said second grooves; and maintaining said equal wrapping of said first and said second cables about said drum when it is rotated.

19. A method as defined in claim 18 further characterized by providing the same width to each of said first and second grooves such that the pitch of the said first and second grooves is equal to two times that width.

* * * * *